United States Patent [19]

Shigeta et al.

[11] Patent Number: 5,009,176
[45] Date of Patent: Apr. 23, 1991

[54] SEWING DATA FORMING METHOD AND DEVICE FOR SEWING MACHINE

[75] Inventors: Katsunori Shigeta; Haruyuki Nakamura, both of Aichi, Japan

[73] Assignee: Mitsubishi Denki K.K., Tokyo, Japan

[21] Appl. No.: 466,182

[22] Filed: Jan. 17, 1990

[30] Foreign Application Priority Data

Jan. 24, 1989 [JP] Japan .................................. 1-14809

[51] Int. Cl.$^5$ ............................................. D05B 21/00
[52] U.S. Cl. ............................ 112/121.12; 112/262.3; 364/470
[58] Field of Search ....................... 112/121.12, 121.11, 112/457, 103, 456, 453, 266.1, 262.3; 364/470, 400

[56] References Cited

U.S. PATENT DOCUMENTS 4,691,649  9/1987  Takano et al. ................... 112/457 X
4,720,795  1/1988  Kinoshita et al. ........... 112/121.12 X

FOREIGN PATENT DOCUMENTS

60-148582  8/1985  Japan .
60-148583  8/1985  Japan .
60-148584  8/1985  Japan .

*Primary Examiner*—Peter Nerbun
*Attorney, Agent, or Firm*—Sughrue, Mion, Zinn Macpeak & Seas

[57] ABSTRACT

A sewing data forming device for sewing machines comprising a coordinate input unit for inputting a coordinate value and a plurality of switches for providing instructions at an operating step, and forming needle position data for the sewing machine by calculating coordinate values sequentially inputted from said coordinate input unit. When needle position data to be newly inputted is within a predetermined distance from previously inputted needle position data, the needle position data to be newly inputted is replaced, when inputted, by the previously inputted needle position data as the same data. Also, a method of forming sewing data for a sewing machine is performed using the above device.

15 Claims, 8 Drawing Sheets

| PATTERN INPUT | START | SCALE | | 1 | 2 | 3 | HIGH SPEED | POINT INPUT | | TRIMMING | RETURN TO ORIGINAL | RESET |
|---|---|---|---|---|---|---|---|---|---|---|---|---|
| WRITE | WRITE/READ START | STITCH LENGTH | | 4 | 5 | 6 | MIDDLE SPEED 1 | LINE INPUT | 2716 | HALFWAY STOP | END | CLEAR |
| READ | | PATTERN NUMBER | | 7 | 8 | 9 | MIDDLE SPEED 2 | | 2732 | FEED | SECOND ORIGINAL | |
| | | | | | 0 | | LOW SPEED | | 2732A | | SAME POINT | STITCH ELIMINATION |

| X AND Y COORDINATES | SEWING DATA |
|---|---|
| $P_1 \begin{cases} x_1 \\ y_1 \end{cases}$ | $\begin{matrix} x_{1a}=0 \\ y_{1a}=0 \end{matrix} \Big) P_{1a}$ |
| $P_2 \begin{cases} x_2 \\ y_2 \end{cases}$ | $\begin{matrix} x_{2a} \\ y_{2a} \end{matrix} \Big) P_{2a}$ |
| $P_3 \begin{cases} x_3 \\ y_3 \end{cases}$ | $\begin{matrix} x_{3a} \\ y_{3a} \end{matrix} \Big) P_{3a}$ |
| $P_4 \begin{cases} x_4 \\ y_4 \end{cases}$ | $\begin{matrix} x_{4a} \\ y_{4a} \end{matrix} \Big) P_{4a}$ |
| $P_{23} \begin{cases} x_{23} \\ y_{23} \end{cases}$ | $\begin{matrix} x_{23a} \\ y_{23a} \end{matrix} \Big) P_{23a}$ |
| $P_{24} \begin{cases} x_{24} \\ y_{24} \end{cases}$ | $\begin{matrix} x_{24a} \\ y_{24a} \end{matrix} \Big) P_{24a}$ |
| $P_{25} \begin{cases} x_{25} \\ y_{25} \end{cases}$ | $\begin{matrix} x_{25a} \\ y_{25a} \end{matrix} \Big) P_{25a}$ |

SEWING DATA FORMING METHOD AND DEVICE FOR SEWING MACHINE

BACKGROUND OF THE INVENTION

1. Field of the Invention

This invention relates to a sewing data forming method and device for so-called electronic sewing machines equipped with an X-Y table which is driven by needle position data.

2. Description of the Related Art

Among industrial electronic sewing machines, an automatic sewing machine which automatically sews a material along a desired sewing pattern by driving either the material or the needle according to sewing information preprogrammed and stored in a memory unit is in practical use. The above-mentioned sewing information is stored in a storage medium of the memory unit, and sewing with different sewing patterns can be performed simply by replacing this storage medium. The storage medium is generally made of semiconductor memories or magnetic cards, and contains control information for controlling the movement of the sewing machine according to the operating procedures. The control information usually consists of information regarding relative offsets between the needle and the material for every stitch that forms the sewing pattern, a sewing speed, and a control command for other movements. The control information for a set of sewing pattern is formed as a collection of control commands for every stitch.

Accordingly, in order to perform the automatic sewing operation according to the desired sewing pattern using this automatic sewing machine, it is necessary to form control data corresponding to the sewing pattern and store it in a predetermined storage medium.

Figure 5:
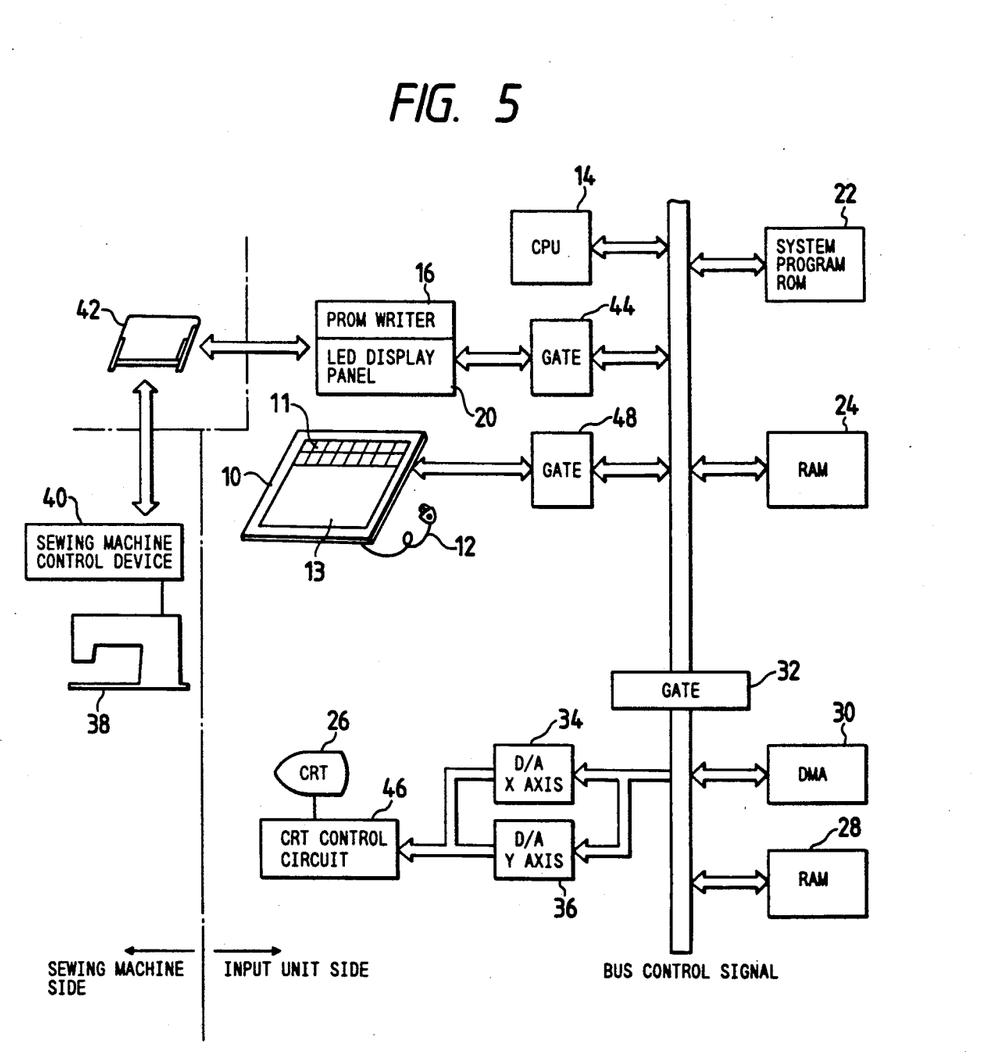
FIG. 5 is a basic block diagram of the device.
Figure 6:
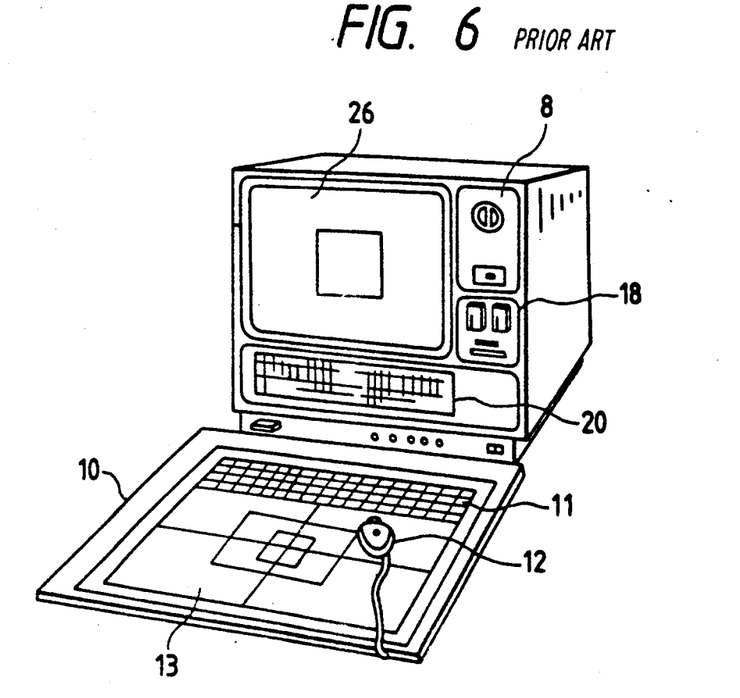
FIG. 6 is a perspective view showing a sewing data forming device for the conventional sewing machine.

FIG. 6 is a perspective view showing a sewing data forming device for the conventional sewing machine disclosed in Japanese Patent Unexamined Publication No. 60-148582. The device is provided with a menu section (11) for inputting and a tablet digitizer (10) having a pattern input section (13), both on the front thereof. The operation of the device will next be explained with reference to the block diagram shown in FIG. 5.

By drawing a desired sewing pattern on the tablet digitizer (10) using a cursor (12), a CPU (14) is caused to control so that the drawn sewing pattern is written as a sewing pattern data signal from a PROM write circuit (16) through a gate (44) to a PROM which forms the desired pattern data. The PROM to which the pattern has been written is then loaded to a sewing machine control unit (40) as a PROM cassette (42) to drive a sewing machine (38). The PROM is inserted into a PROM socket (18) shown in FIG. 6. Various modes and operating procedures at the time of input are displayed as I/O data on an LED display panel (20) through the gate (44). A program by which the input data is written by the CPU (14) to the PROM from the tablet digitizer (10) through a gate (48) is stored in a system program ROM (22). Thus, the CPU (14) performs a processing according to this program. The input data from the tablet digitizer (10) is temporarily stored in a data memory RAM (24) composed of a RAM, and the memory values are stored therein as relative value data which indicate X and Y coordinate data of the tablet digitizer (10) in terms of X, Y stitch offsets. A monitor display CRT (26) is also provided to monitor data when input data of the tablet digitizer (10) is written to the PROM. The CPU also converts the data in the data memory RAM (24) into graphic data, and causes the graphic data thus converted to be stored in a graphic data memory RAM (28) through a gate (32). The data thus stored are converted from digital values into analog values (voltage) by D/A converters (34) and (36) through a DMA controller (30). Then, the sewing pattern graphic is displayed on the CRT (26) by the CRT control circuit (46). This allows the operator to input data while confirming it by referring to the graphic display.

Figure 7:
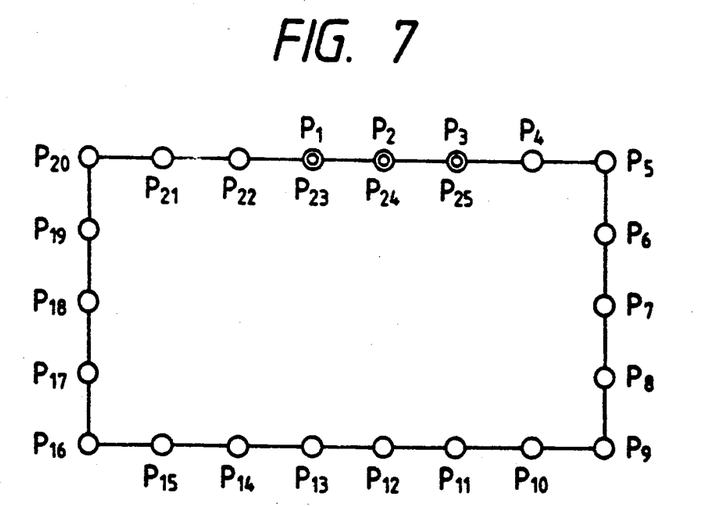
FIG. 7 is a diagram showing an example of sewing patterns.

FIG. 7 shows one example of the sewing pattern for sewing a label to a shirt. The formation of sewing pattern data and operation of sewing based on the sewing pattern data will now be described in detail. A sewing start point P is specified on the tablet digitizer (10) by the cursor (12). Similarly, sewing points $P_1 P_2 P_3 \ldots P_{23} P_{24} P_{25}$ are specified to form the sewing pattern data.

In this case, it happens that the points $P_1$, $P_2$, $P_3$ are superimposed on the points $P_{23}$, $P_{24}$, $P_{25}$ at the same position, respectively. This processing is necessary to give a neat finish to the sewed material, and is commonly practiced.

Figure 8:
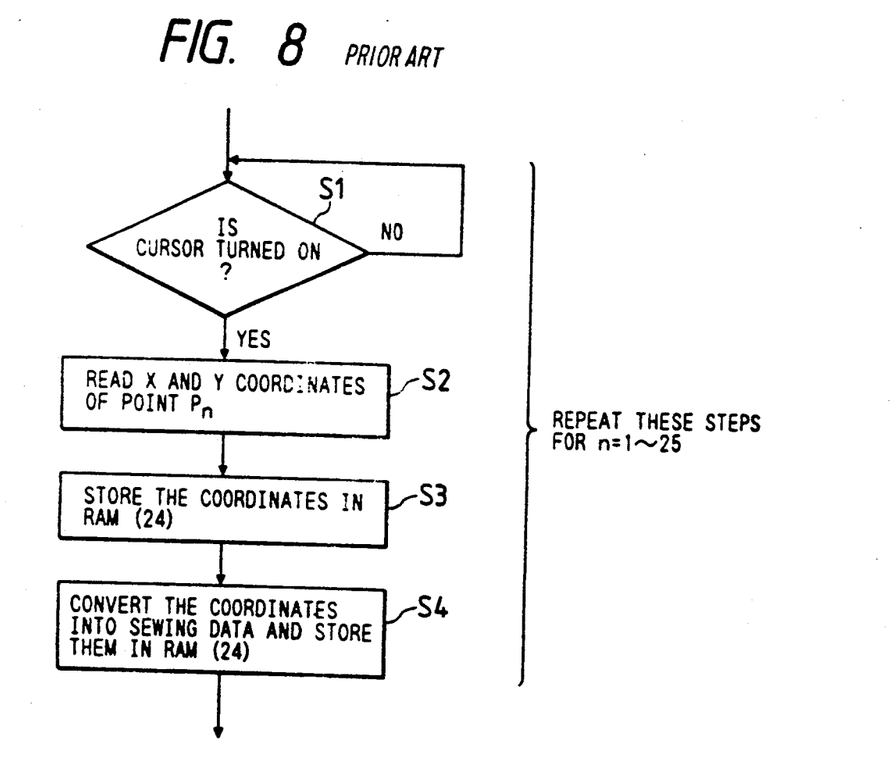
FIG. 8 is a flowchart showing the operation of the conventional device.

FIG. 8 is a flowchart showing the operation of forming the above-mentioned data. Upon turning on a switch of the cursor (12) in Step S1, the X and Y coordinate values of point P are read in Step S2. The read coordinate values are stored in the data memory RAM (24) in Step S3, and further converted into sewing data for the sewing machine in Step S4 before being stored in the data memory RAM (24) again. The same processing is performed for the points $P_2$, $P_3$, $P_4$, $\ldots P_{25}$.

Figure 9:
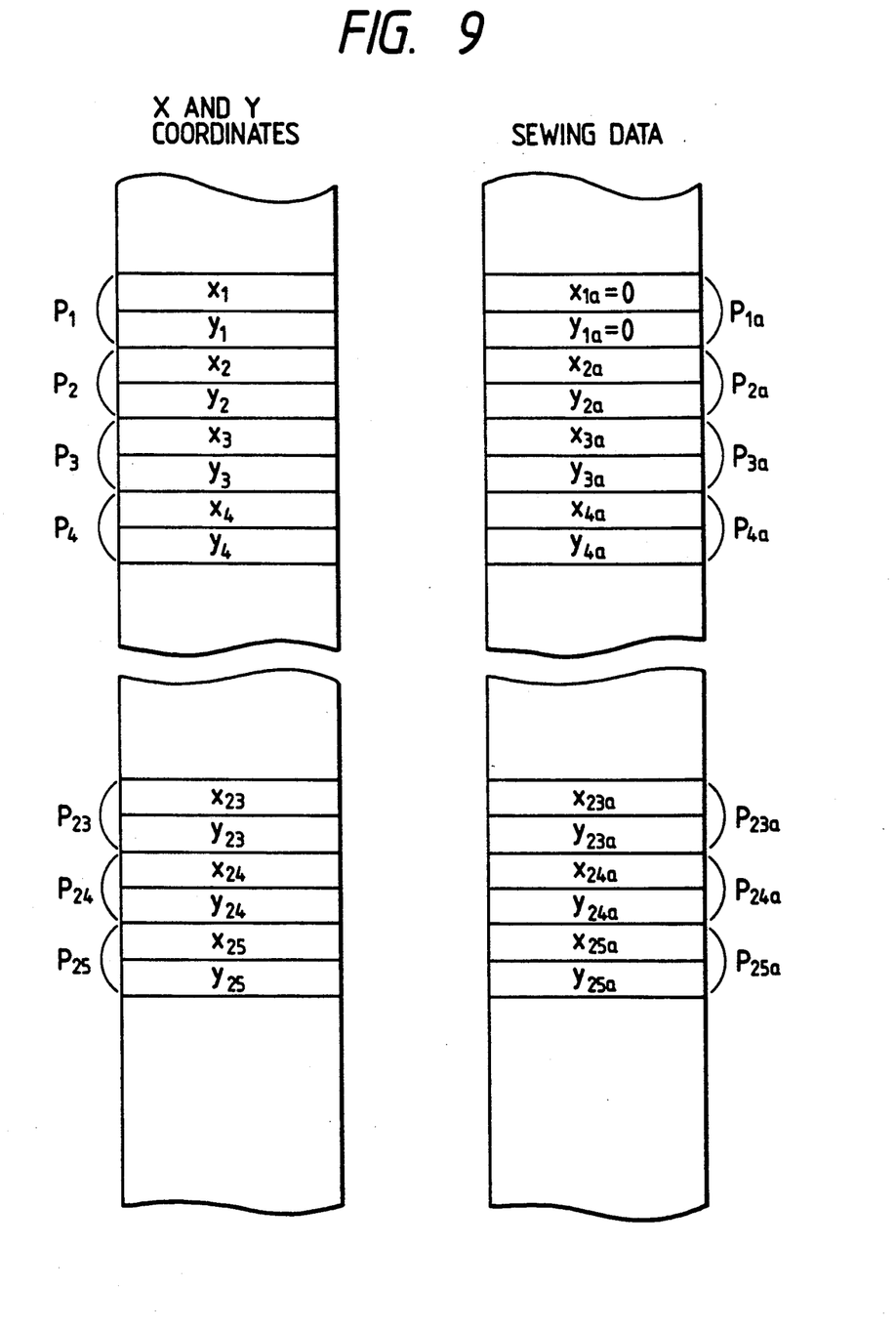
FIG. 9 is a diagram showing the content of the data memory.

FIG. 9 is an example of the content in the data memory RAM (24) in which the sewing pattern data shown in FIG. 7 is stored. In the figure, reference numerals $X_1$, $Y_1$, $\ldots X_{25}$, $Y_{25}$ designate portions in which the data read by the digitizer (10) is stored. $X_{1a}$, $Y_{1a}$, $\ldots X_{25a}$, $Y_{25a}$ are the data after the data read by the digitizer have been converted into the sewing data for the sewing machine. The data before and after the conversion are formed in correspondence to needle position points $P_1$, $P_2$, $\ldots P_{25}$.

The sewing data forming device for the conventional sewing machine is constructed as described above, so that, in the case where the input operation is performed so as to superimpose the points $P_{23}$, $P_{24}$, $P_{25}$ upon the points $P_1$, $P_2$, $P_3$ as shown in FIG. 7, it is necessary to instruct the cursor (12) to be positioned correctly on the points $P_1$, $P_2$, $P_3$ which have already been inputted. However, it is extremely difficult to coincide the position data of the points $P_{23}$, $P_{24}$, $P_{25}$ with points $P_1$, $P_2$, $P_3$ due to the fact that the size of the points $P_1$, $P_2$, $P_3$ is small or that the manual operation entails imprecision.

SUMMARY OF THE INVENTION

This invention has been made to overcome the above difficulties with the conventional device, and it is an object of this invention to provide a sewing data forming method and device for sewing machines capable of easily generating exactly the same needle position data as previously inputted needle position data when the needle position data is to be newly inputted so as to be superimposed on the previously inputted needle position data.

The sewing data forming method and device for sewing machines according to this invention is arranged so that if needle position data to be newly inputted is within a predetermined distance from previously inputted needle position data, the needle position data to be newly inputted is replaced, when inputted, by the previously inputted needle position data as the same data.

In this invention, it is judged whether or not the needle position data to be newly inputted is within a predetermined distance from the previously inputted needle position data, and if it is within the predetermined distance, it is replaced by the previously inputted needle position data. Further, the replacement of the data is achieved when the same-data selecting instruction is given.

DETAILED DESCRIPTION OF THE PREFERRED EMBODIMENTS

Embodiments of the invention will be described with reference to the drawings.

Figure 1:
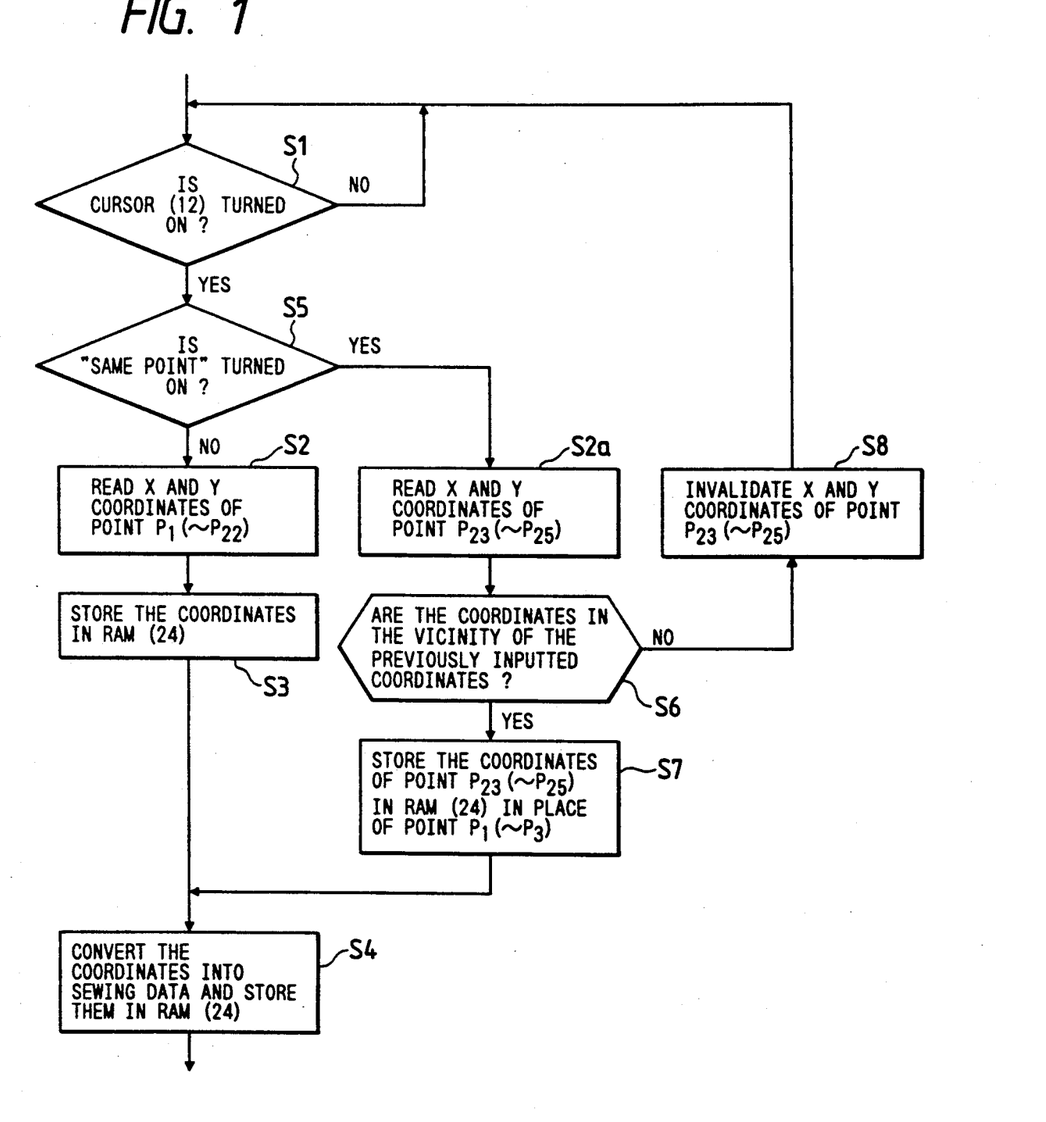
FIG. 1 is a flowchart showing the operation of an embodiment of a sewing data forming device according to the invention.
Figure 2:
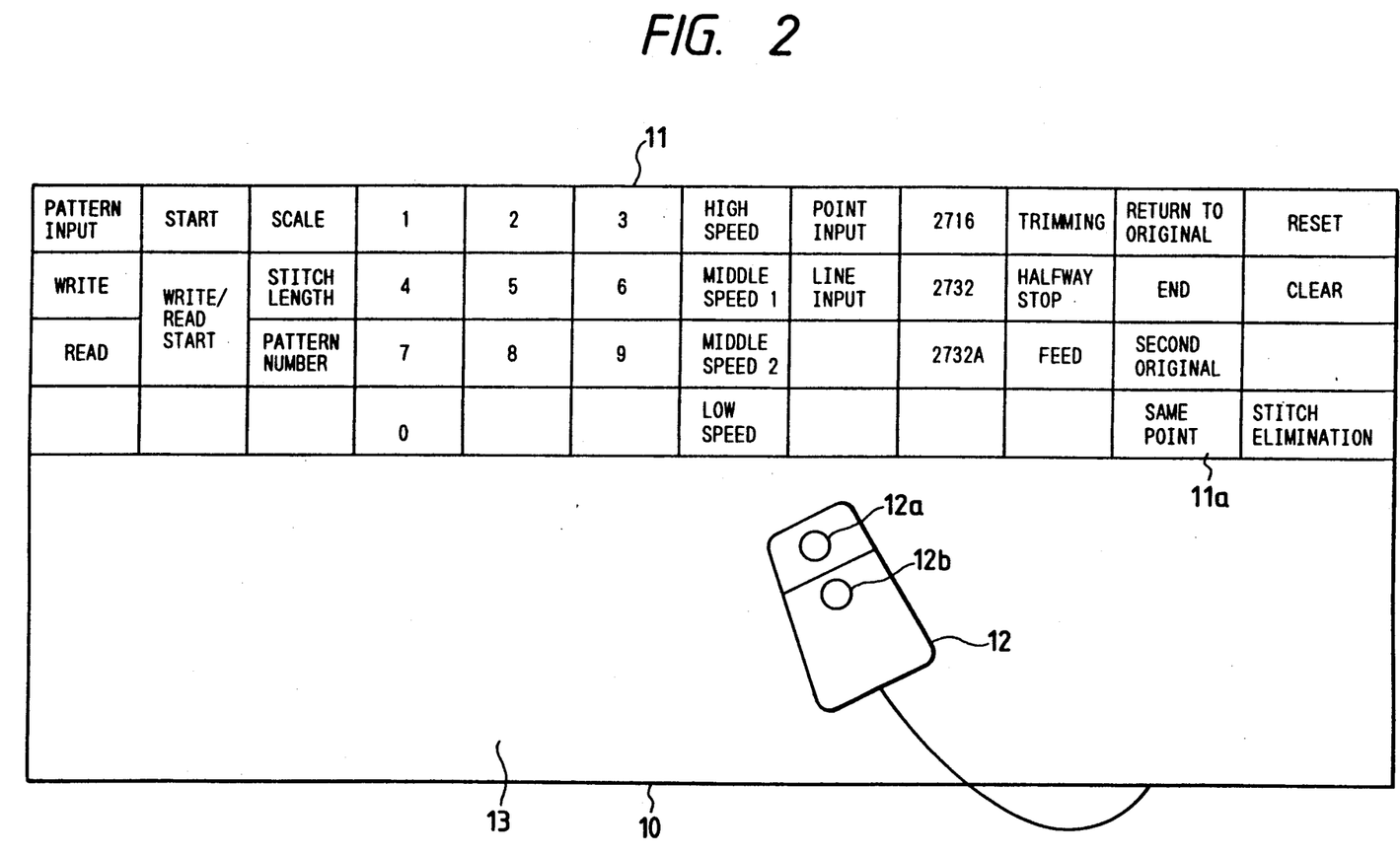
FIG. 2 is a explanatory diagram of the device.

FIG. 2 is a diagram of a tablet digitizer (10) provided in a sewing data forming device for sewing machines shown in FIG. 5. There is provided a special "SAME POINT" key (11a) in a menu section (11) of the tablet digitizer (10) therein shown. The input operation of the sewing pattern shown in FIG. 7 will now be described based on the flowchart shown in FIG. 1.

The "SAME POINT" key (11a) has the function of giving an instruction for replacing the coordinates of a point A with the coordinates of a point B if the coordinate data of the point A (e.g., $P_{23}$ in FIG. 4) which is to be inputted after pressing this key (11a) is in the vicinity of the coordinate data of the point B (e.g., $P_1$ in FIG. 4) which has previously been inputted. "Vicinity" means the state in which the point A is present within a predetermined distance from the point B which has been drawn on the pattern input section (13); and the value of the predetermined distance is preset.

First, point $P_1$ is specified by the cursor (12) as is the case with the conventional device in Step S1. Since the "SAME POINT" (11a) key has not yet been turned on at this moment, no data will be formed until the same processing steps S2, S3, and S4 as in the conventional device are performed. Upon completion of the same processing steps for $P_2$, $P_3$, $P_4$, ... $P_{22}$, the corresponding data are formed, respectively. Then, in order to form data for $P_{23}$ at the same position as $P_1$, the "SAME POINT" key (11a) on the menu section (11) is operated by the cursor (12), and the "vicinity" for the point $P_{23}$ is specified by the cursor (12). Then, it is judged in Step S5 that the "SAME POINT" has been turned on, whereby the processing step S6 will be performed after the coordinates of the point $P_{23}$ are read in Step S2a.

In Step S6 it is checked whether or not the coordinate data of point $P_{23}$ is in the "vicinity" of any one of the previously inputted points, i.e., $P_1$ in this case (e.g., $|P_{23x}-P_{1x}|<1$ mm for the X coordinate of $P_{23}$ and $|P_{23y}-P_{1y}|<1$ mm for the Y coordinate of $P_{23}$ are simultaneously satisfied). If it is in the "vicinity", the coordinates of $P_{23}$ are replaced by the coordinates of the previously inputted point P1 in Step S7, while if it is not in the "vicinity", the coordinates of $P_{23}$ just inputted are invalidated and another input is prompted in Step S8.

As described above, by performing the same processing steps for $P_{24}$, $P_{25}$ upon completion of the processing for $P_{23}$, the position data of $P_{23}$, $P_{24}$, $P_{25}$ can be made coincident with the previously inputted position data of $P_1$, $P_2$, and $P_{23}$. The total of position data or the number of points at which the newly inputted data are superimposed on the previously inputted data is not limited by the number of data in the above example ($P_1$ to $P_{25}$). According to what is described above, the needle position to be newly inputted may be inputted in the "vicinity" of the previously inputted needle position even in the case where it is required that a new needle position be inputted so as to be exactly superimposed on the previously inputted needle position, thereby allowing the sewing data forming time to be significantly reduced.

Figure 3:
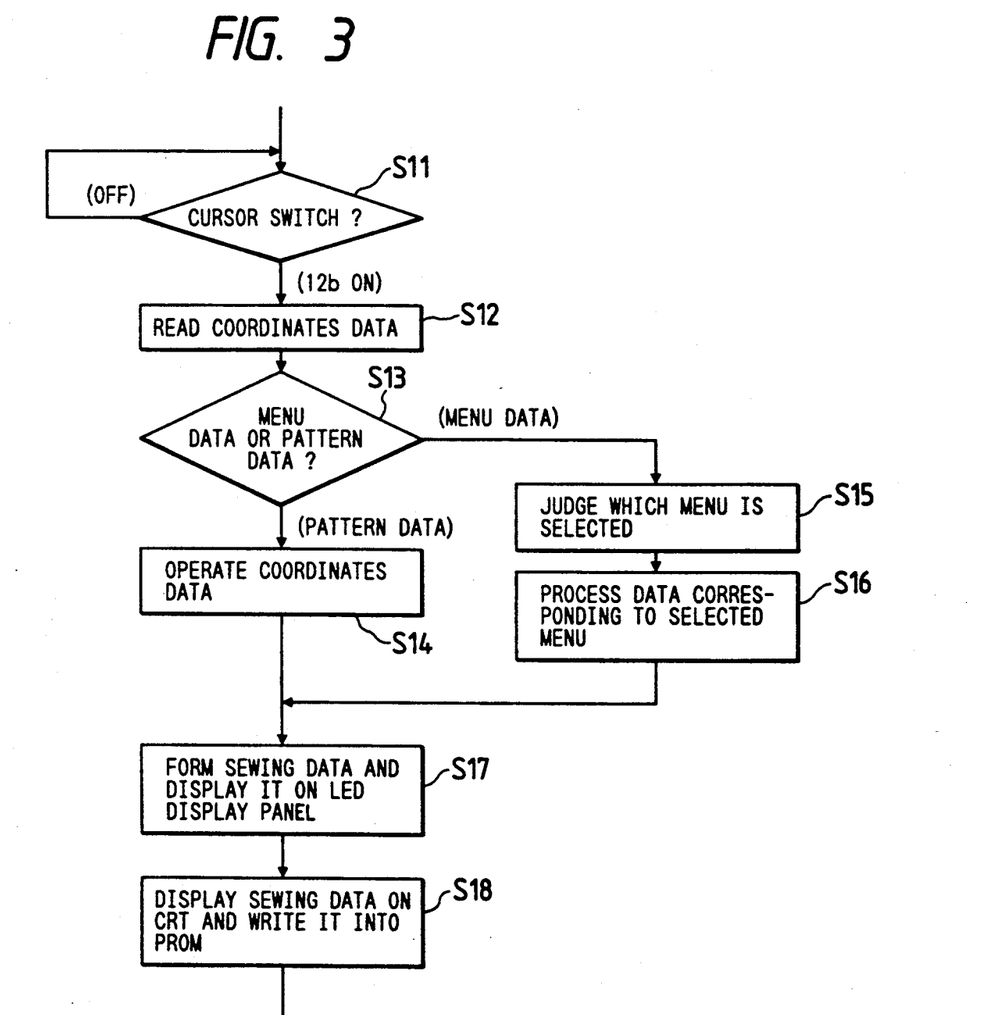
FIGS. 3 and 4 are flowcharts showing the operation according to the invention, respectively.

Referring to FIGS. 2 and 3, there are shown the pattern input section (13) and the menu section (11) provided on the tablet digitizer (10). When the coordinates reading section (12a) of the cursor (12) is set on the portion of one menu in the menu section (11), e.g. the portion of a "SAME POINT" menu (11a) therein, and the cursor switch (12b) of the cursor (12) is depressed, the coordinates of the portion can be read. In the flow chart used for explaining the processing of the coordinates thus read, as shown in FIG. 3, when the cursor switch (12b) of the cursor (12) is turned on in Step S11, it is judged whether the value of the coordinates read in Step 12 is input from the pattern input section (13) or the menu section (11) in Step 13. As a result, if it is the coordinates for the menu section, then it is judged which of the keys in the menu section is pressed in Step 15, and the processing is carried out corresponding to the selected menu in Step 16.

As shown in FIG. 2, a plurality of coordinates which indicate the operation procedure are predetermined in the menu section (11), which coordinates are read by the aid of the cursor switch (12b), and the pattern data is subjected to coordinates data operation process by the aid of the cursor switch (12b) in the pattern input section (Step 4) to form sewing data, to display it on the LED display panel (20) (Step 17), to display it on the CRT (26), and to write it into the PROM (Step 18), successively.

With the above-described operation, the quality of sewing such as label-sewing shown in FIG. 7 is greatly improved.

In the above explanation, it is checked in Step 6, whether the coordinates to be newly inputted are in the vicinity of the coordinates which have already been inputted, or not. The distance between the former and the latter is allowable to the extent that the sewed portions are neatly arranged. Accordingly, the allowable deplacement of 1 mm may be changed depending upon the contents of sewing.

In Step 8, if the newly input coordinates are not in the vicinity of the coordinates which have already been input, then it is invalidated. At this time, if the position thus invalidated is displayed on the CRT 26 for monitor display, employing a mark different from other marks, attention is drawn to an operator who sequentially tries to make new input coordinates in the vicinity of the same coordinates which have already been input. As a result, data can be easily formed.

In the above embodiment, an instruction for "SAME POINT" is made by pushing the "SAME POINT" key (11a) of the menu section (11) provided on the tablet digitizer (10). However, another switch may be adopted which is constructed so as to be continuously turned on during a constant working.

Figure 4:
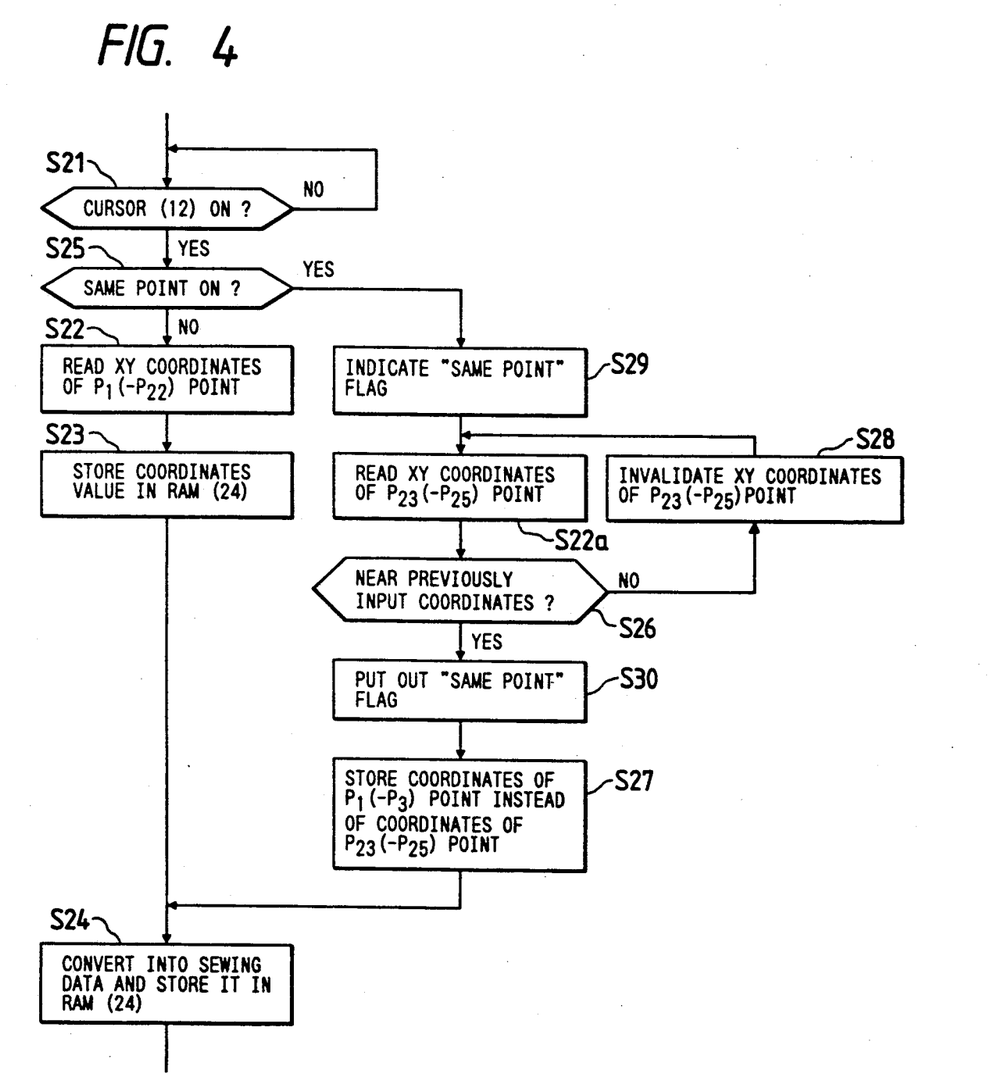

Further, once the "SAME POINT" key is turned on, working can be continued until the same position is selected, that is, during the period of time when the invalidation of newly input positions is continued. This example is shown in FIG. 4.

In the embodiment described above, that is, in FIG. 1, after the coordinates of the point P23 is read in Step 2a, when the coordinates of the point P23 are not in the vicinity of the point P1 which has been input (in Step S6), the coordinates value of P23 which has now been input is invalidated in Step 8, and it is required that inputting the point of P23 is repeated after the "SAME POINT" key is pressed again. On the contrary, in the embodiment shown in FIG. 4, once the "SAME POINT" key is pressed, the key is kept on until the same point desired is found. The operation of the embodiment in FIG. 4 will be described.

When the "SAME POINT" key is pressed in Step 25, a "SAME POINT" flag is indicated so that the fact that the key has been pressed is stored. Then, the same processing as that of the embodiment in FIG. 1 is performed in Steps 22a and 26, and if the needle position to be newly inputted is near the desired position, then the "SAME POINT" flag indicated in Step 29 is put out in Step 30, and the same processing as that of the embodiment of FIG. 1 is performed in Steps 27 and 24.

On the contrary, if the coordinates value read in Step 22a is not in the vicinity of the needle position desired, then the coordinates value of P23 which has now been read is validated in Step 28, and a new coordinates value of P23 can be allowed to be input again in Step 22a.

As described above, once the "SAME POINT" key is pressed, the operation for searching the same point desired can be continued until the desired point has been searched, which operation is more effective than that of the embodiment shown in FIG. 1.

Thus, according to this invention, when the needle position data to be newly inputted is within a predetermined distance from the previously inputted needle position data, the needle position data to be newly inputted is replaced, when inputted, by the previously inputted needle position data. Accordingly, it is possible to easily form the needle position data to be newly inputted at exactly the same position as the previously inputted needle position data, thereby allowing a sewing data forming method and device for sewing machines capable of greatly improving the quality of sewing products to be obtained.

WHAT IS CLAIMED:

1. A method of forming sewing data for a sewing machine, comprising the steps of:
   succesively reading coordinates data from a coordinates input device;
   calculating a first needle position data according to said coordinates data; and
   if said first needle position data is within a predetermined range from second needle position data which has previously been input, then replacing said first needle position data by the same data as said second needle position data.

2. A method of forming sewing data for a sewing machine, the method comprising the steps of:
   succesively reading coordinates data from a coordinates input device;
   calculating a first needle position data according to said coordinates data;
   generating a same-position selecting instruction;
   detecting whether said first needle position data is within a predetermined range from second needle position data which has previously been input; and
   replacing said first needle position data by the same data as said second needle position data in response to detection of both of said same point selecting instruction and said first needle position data being within said predetermined range.

3. A method as claimed in claim 1, wherein said first needle position data replaced by said same data as said second needle position data is stored as control data for an automatic sewing machine.

4. A method as claimed in claim 2, said first needle position data replaced by said same data as said second needle position data is stored as control data for an automatic sewing machine.

5. A method as claimed in claim 1, wherein said coordinates input device comprises a figure reading device.

6. A method as claimed in claim 2, wherein said coordinates input device comprises a figure reading device.

7. A method as claimed in claim 1, wherein said first needle position data replaced by the same data as said second needle position data is displayed with a mark different from marks representing other data on a display unit.

8. A method as claimed in claim 2, wherein said first needle position data replaced by the same data as said second needle position data is displayed with a mark different from marks representing other data on a display unit.

9. A method as claimed in claim 2, further comprising the step of invalidating said first needle position data in response to detection of said same-position selecting instruction and said first needle position data being out of said predetermined range.

10. A method as claimed in claim 9, further comprising the step of keeping said same-position selecting instruction when said first needle position data is invalidated.

11. A method as claimed in claim 2, further comprising the step of displaying said first needle position data with a mark indicating invalidation on a display unit in response to detection of said same-position selecting instruction and said first needle position data being out of said predetermined range.

12. A device for forming sewing data for a sewing device, comprising:
   coordinates input means for inputting coordinate values of a needle position;
   operation means for controlling the coordinate values successively inputted from said coordinates input means to obtain first needle position data for a sewing machine;
   detection means for detecting whether said first needle position data input is within a predetermined range from second needle position data which has been already inputted and conversion means for replacing said first needle position data by said second needle position data when it is detected by said detection means that said first needle position data is within said predetermined range.

13. A device as claimed in claim 12, further comprising a same-position selecting means for instructing at least one of said detection means and said conversion means to allow said first needle position data to be replaced by said second needle position data.

14. A device as claimed in claim 13, wherein said same-position selecting means comprises a switch.

15. A device as claimed in claim 14, wherein said coordinates input means comprises a figure reading device, and said same-position selecting means is provided in a pattern input section of a tablet digitizer.

* * * * *